United States Patent [19]
Koch et al.

[11] Patent Number: 5,127,812
[45] Date of Patent: Jul. 7, 1992

[54] POULTRY BREAST FILLET SKINNER

[76] Inventors: Jay Koch, 177 Ocean Shore Dr., Key Largo, Fla. 33037; Andrew C. Estes, 211 Widgeon Rd.; Travis W. Arterbury, 1700 W. 4th, both of Russellville, Ark. 72801

[21] Appl. No.: 782,610

[22] Filed: Oct. 25, 1991

[51] Int. Cl.⁵ .................................................. A22C 21/00
[52] U.S. Cl. ...................................... 452/125; 452/136
[58] Field of Search ............... 452/128, 125, 130, 136, 452/138

[56] References Cited

U.S. PATENT DOCUMENTS

| | | | |
|---|---|---|---|
| 3,568,243 | 3/1971 | Hines | 452/125 |
| 4,856,143 | 8/1989 | Callsen et al. | 452/130 |
| 4,873,746 | 10/1989 | Scheier et al. | 452/136 |
| 4,993,114 | 2/1991 | Meyer et al. | 452/136 |

FOREIGN PATENT DOCUMENTS 9001435  4/1991  Netherlands .................... 452/125

*Primary Examiner*—Willis Little
*Attorney, Agent, or Firm*—Ray F. Cox, Jr.

[57] ABSTRACT

A poultry breast fillet skinner includes a table, a lower conveyor supported on the table, an upper conveyor with means to allow the upper conveyor to be pressed down toward the lower conveyor so as to firmly grip the poultry breast fillet, and a wing disposed between the upper and lower conveyors which affects the separation of the skin from the poultry breast fillet. In the preferred embodiment the separation process is assisted by a pair of openings provided on the pointed ends of the projections of the wing. Pressurized air is expelled into natural pockets formed between the skin and the meat portion of the poultry breast fillet which assist in beginning the process of separating the skin from the meat portion of the poultry breast fillet.

8 Claims, 4 Drawing Sheets

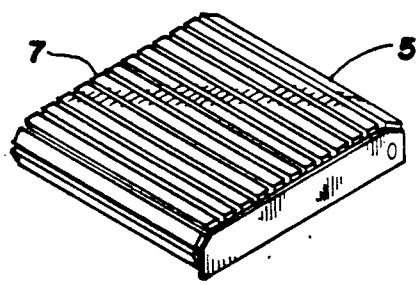
FIG. 1
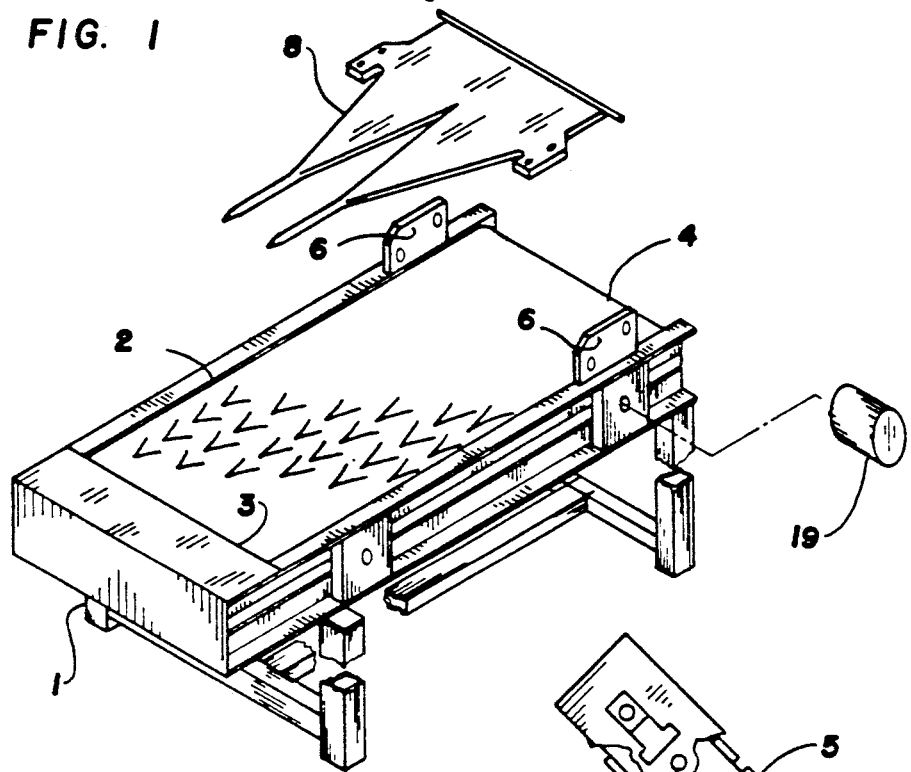
FIG. 2
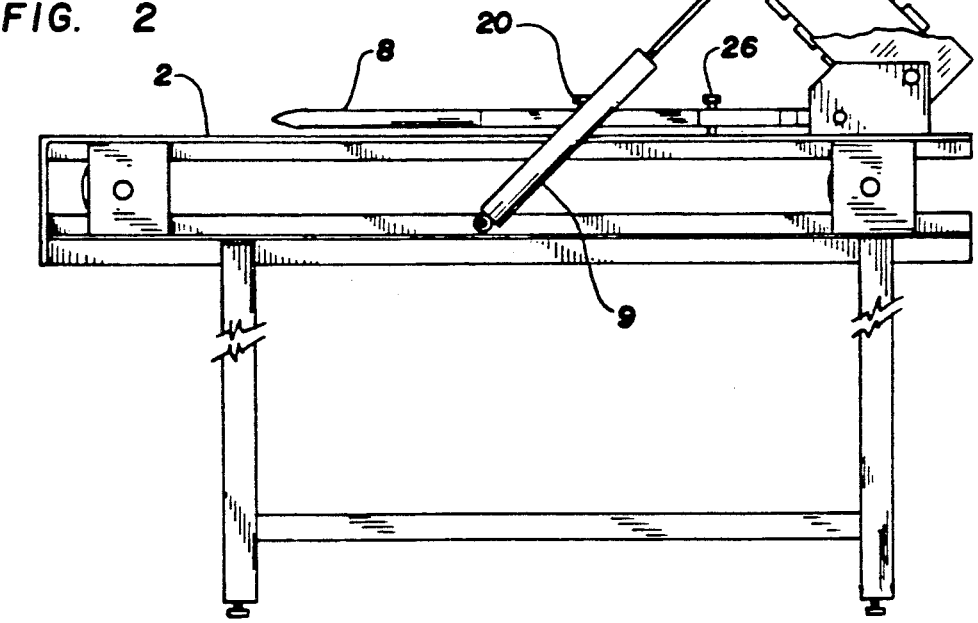

POULTRY BREAST FILLET SKINNER

BACKGROUND OF THE INVENTION

The present invention relates to a device for removing the skin from a poultry breast fillet which has been separated from the poultry carcass.

Various mechanisms have been developed which are capable of removing the skin from a poultry breast as well as other poultry pieces. The typical skinning device incorporates a pair of intermeshing helical-cut counter-rotating rollers. Examples of such devices may be found in U.S. Pat. No. 4,697,307 entitled "Chicken Thigh Skinner" issued on Oct. 6, 1987 to Martin; U.S. Pat. No. 4,723,339 entitled "Breast Skinner" issued to van de Nieuwelaar on Feb. 9, 1988 and U.S. Pat. No. 3,930,283 entitled "Machine for Removing Skin from Pieces of Poultry" issued to Martin on Jan. 6, 1976. These rollers act to remove the skin from a piece of poultry by engaging pieces of the skin and tearing or pulling the skin away from the poultry part. Such devices generally damage valuable meat to the extent the meat must be downgraded so as not to be sold in its intended premium market. The above described machines also allow some meat to remain attached to the removed skin, especially in the rib cage area, so as to waste valuable saleable meat.

Poultry processing areas are required to maintain a high degree of cleanliness in their operations. Devices such as the type described above tend to clog with skin, cartilage and other debris causing frequent cleaning operations. This clogging if unjammed by the machine operator potentially can cause a severe safety hazard.

A need therefore exists for a poultry processing machine which is capable of removing the skin from cut-up poultry parts, in particular poultry breast fillets, while allowing the breast meat to remain undamaged, while assuring the maximum meat yield available and allowing safer and more sanitary operations.

SUMMARY OF THE INVENTION

In accordance with the present invention, a unique apparatus for removing the skin from poultry fillets is provided. The apparatus includes a table, a lower conveyor supported on the table, an upper conveyor with means to allow the upper conveyor to be pressed down toward the lower conveyor so as to firmly grip the poultry breast fillet, and a wing disposed between the upper and lower conveyors which effects the separation of the skin from the poultry breast fillet. In the preferred embodiment the lower conveyor is a rubber belt having V-shaped wedges on its surface to provide traction to move the poultry breast fillet through the mechanism. The upper conveyor in the preferred embodiment comprises a set of linked slats which provide the necessary traction for completing the process of moving the poultry breast fillet through the mechanism and effecting the skin removal process.

The upper conveyor and the wing are pivotally attached to the table and the vertical distance between the conveyors and the wing may be adjusted to insure that the poultry breast fillet is firmly gripped between the conveyors and wing so that it is positively transported through the skinning mechanism. The wing which provides the skin separation action has a pair of forward pointing projections which initiate the skin separation process when the projections are inserted into pockets formed between the skin and the two halves of the "butterflyed" breast fillet. The projections widen toward the discharge end of the mechanism so that the skin is gradually separated from the breast portion as the piece travels through the machine. The pair of forward facing projections gradually widen toward the discharge end of the machine finally defining a narrow, sharp edged slot. The sharp edges of the slot sever the remaining connection of the skin to the breast fillet allowing the skinned breast fillet and the skin to be discharged separately.

In the preferred embodiment the separation process is assisted by a pair of openings provided on the pointed ends of the projections of the wing. Air under greater than ambient pressure is discharged through these openings. Pressurized air is expelled into natural pockets formed between the skin and the meat portion of the breast. The pressurized air assists in beginning the process of separating the skin from the remaining portion of the breast fillet.

BRIEF DESCRIPTION OF THE DRAWINGS

FIG. 1 is an exploded perspective view of the apparatus.

FIG. 2 is a side elevation of the apparatus showing the upper conveyor in a raised configuration for cleaning or maintenance.

DETAILED DESCRIPTION OF THE PREFERRED EMBODIMENT

Figure 3:
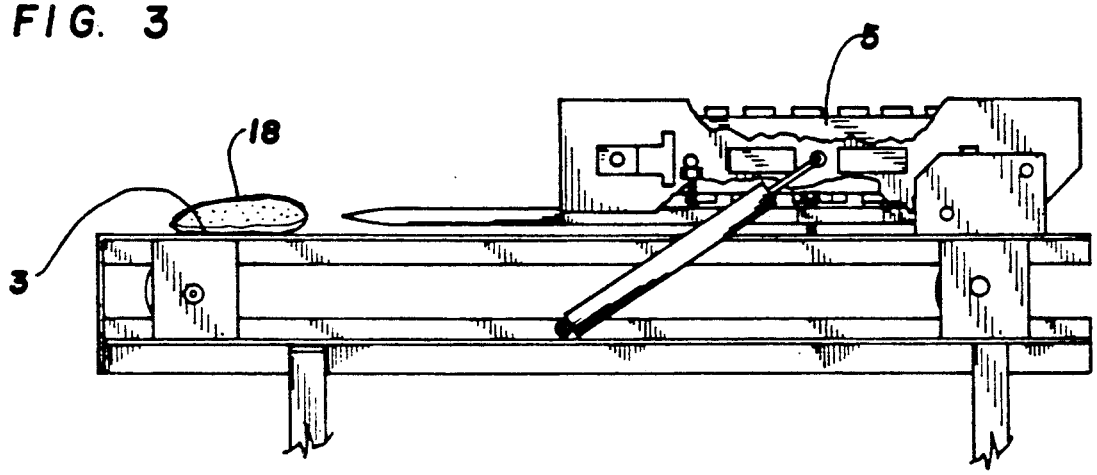
FIG. 3 is a side elevation of the device showing the upper conveyor in the operational configuration. In this view the pneumatic piston for raising the upper conveyor is removed for clarity.

With reference to FIG. 1, a table 1 supports a lower conveyor 2. The lower conveyor 2 comprises a rubber belt having V-shaped wedges on its surface to provide traction. The lower conveyer 2 has a feed end 3 and a discharge end 4. An upper conveyor 5 and the wing 8 are pivotally attached to the table 1 near the discharge end 4 by means of pivot brackets 6.

In the preferred embodiment, the upper conveyor 5 comprises a belt of linked slats, an example of which is designated by 7. The motion of the lower conveyor 2 and the upper conveyor 5 are such as to transport a breast fillet placed into the apparatus from the feed end 3 to the discharge end 4. Means for effecting the motion of the lower conveyor 2 and the upper conveyor 5 may be any of a number of well known techniques in the art such as electric or hydraulic motors, generically designated as 19.

The key component of the skin removal mechanism is a wing designated generally as 8. The wing 8 is positioned between the lower conveyor 2 and the upper conveyor 5.

The poultry breast fillet is transported through the mechanism skin side up. With reference to FIG. 2, the vertical distance between the lower conveyor 2 and the wing 8 and between the wing 8 and the upper conveyor 5 may be adjusted to assure positive transport of the poultry breast fillet through the mechanism. In FIG. 2, the upper conveyor 5 is shown in a raised position. The raising of the upper conveyor for sanitation is affected by a pneumatic cylinder 9.

Figure 3A:
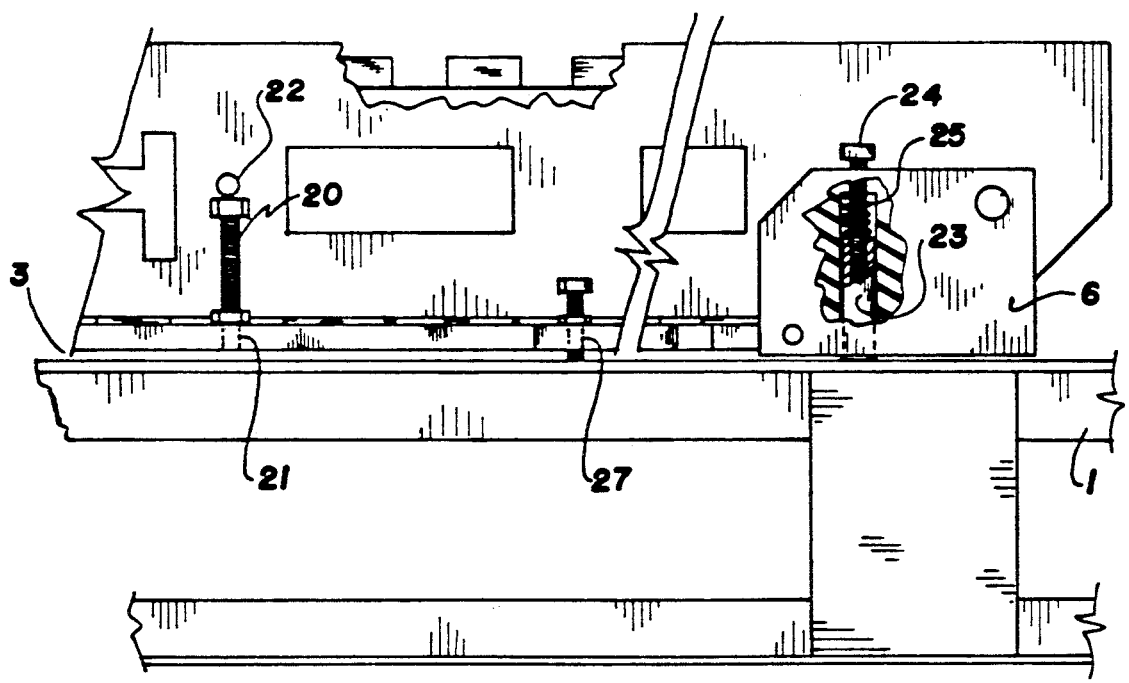
FIG. 3A is a detail showing means for adjusting the orientation between the conveyors and the wing.

With reference to FIG. 3A, the means for providing adjustments of the vertical distance between the conveyors and the wing are illustrated. Means are provided to adjust the angle between the upper conveyor 5 and the wing 8. This angle is set so that the skin portion of the poultry breast fillet is firmly gripped between the wing 8 and the upper conveyor 5. A bolt 20 is threadedly received into an opening 21 in the wing 8. A stop 22 on the upper conveyor 5 rests upon the head of the bolt 20. By adjusting the height of the head of the bolt 20 above the wing 8, the angle between the wing 8 and the upper conveyor 5 may be set. This angle is fairly constant and requires infrequent adjustment.

Again with reference to FIG. 3A, the vertical distance between the wing 8 and the lower conveyor 3 is set so that varying thicknesses of poultry breast fillets may be firmly gripped between the wing 8 and the lower conveyor 3 and positively transported through the mechanism. The means for adjusting the vertical distance between the wing 8 and the lower conveyor 3 comprise a column 23 which is rigidly affixed to the table 1. The column 23 is received in an opening in the pivot bracket 6 such that the pivot bracket 6 is free to move vertically while it is restrained from any horizontal movement. An adjustable bolt 24 is threadedly received in column 23 such that the bolt 24 when turned in either direction forces the pivot bracket 6 to move up or down the column 23. A compression spring 25 offers resistance to the up or down adjustment for stabilization of the bracket 6. Since the upper conveyor 5 and the wing 8 are pivotally attached to the pivot bracket 6, vertical adjustment of the pivot bracket 6 necessarily entails adjustment of the vertical distance between the wing 8 and the lower conveyor 3. The mechanism comprises a pair of pivot brackets 6 and it should be understood that the above discussion relates to each of the pair of pivot brackets 6.

A final means of adjustment of the orientation of the wing 8 relative to the lower conveyor 3 is provided by an adjustable bolt 26 which is threadedly received into an opening 27 in the wing 8. The adjustable bolt 26 bears on the table 1 by adjustment of the degree of penetration of the bolt 26 into the wing 8. The relative angle between the wing 8 and the table 1 may be obtained. It is thus possible to place the wing 8 in a non-parallel orientation to the lower conveyor 3. This allows the separation between the wing 8 and the lower conveyor 3 at the feed end to be greater than the vertical separation at the discharge end. Such an orientation may be necessary to allow the mechanism to accept varying thicknesses of poultry breast fillets without the necessity of constant adjustment of the mechanism.

Figure 6:
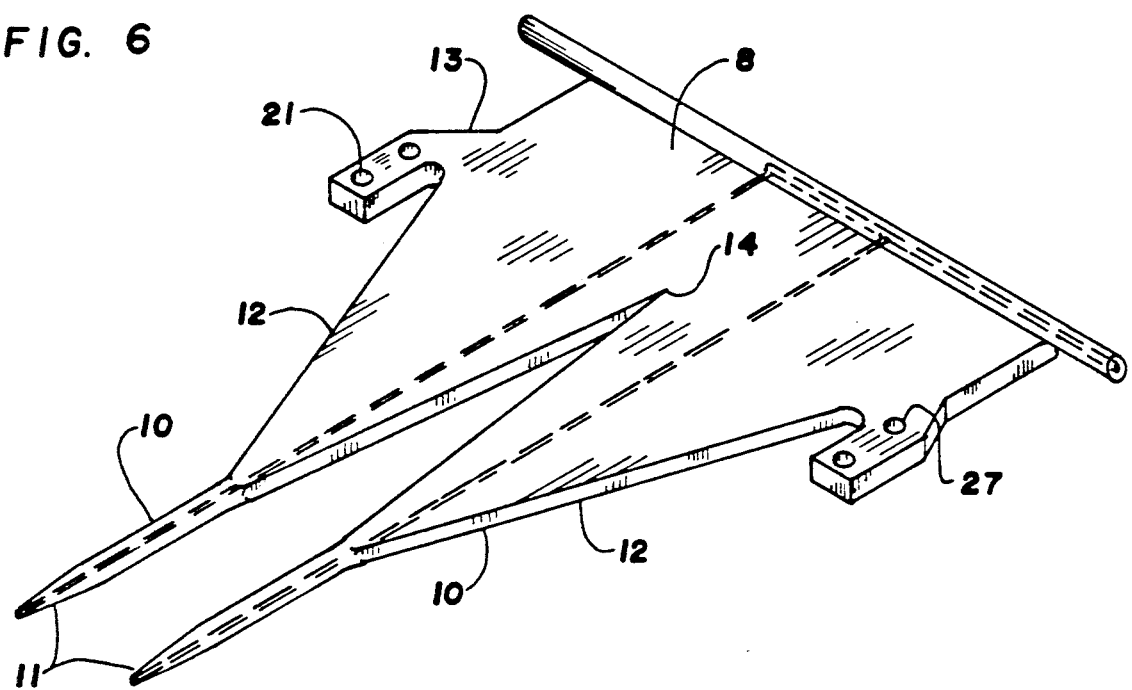
FIG. 6 is a perspective view of the wing.

Again, with reference to FIG. 2 it may be seen that the wing 8 is disposed in a position between the lower conveyor 2 and the upper conveyor 5. With reference to FIG. 6, the wing 8 comprises a pair of rounded projections 10 facing toward the feed end 3. The rounded projections have pointed ends 11 facing toward the feed end 3. Each of the projections 10 has a flared section 12 which gradually widens toward the discharge end 4 where the projections 10 gradually merge into the main body 13 of the shoe 8. The widening flared portions 12 define a sharp edged slot 14 at the point where the flared portions 12 merge into the main body 13.

Figure 4:
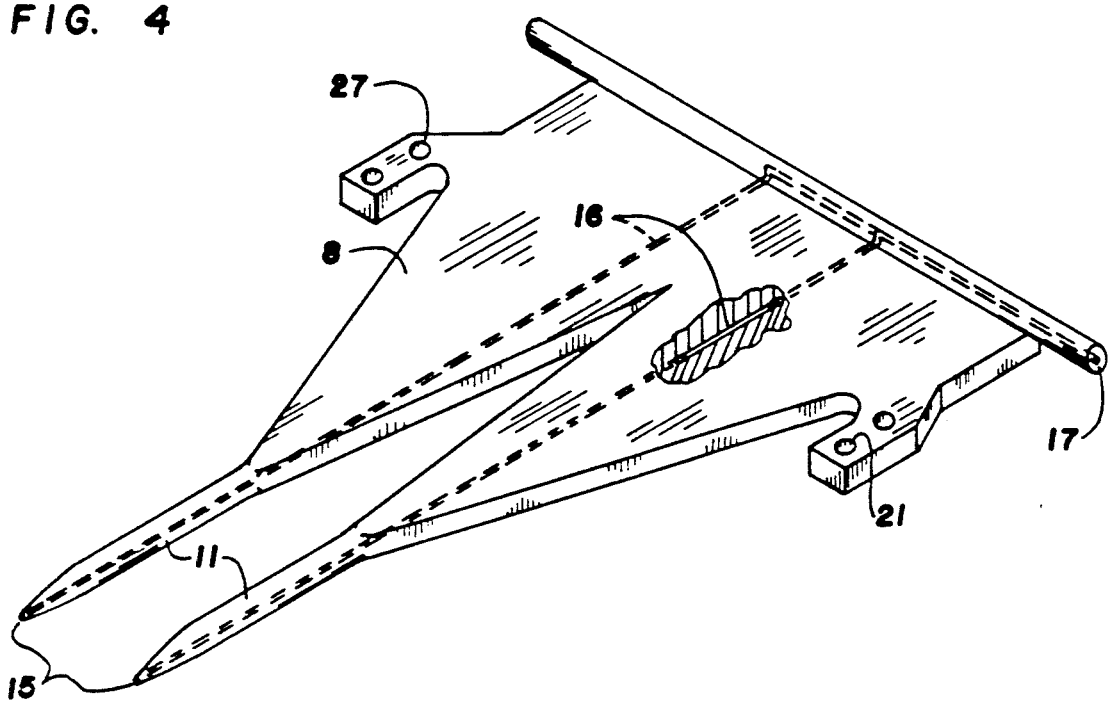
FIG. 4 is a perspective view of the wing having a partial section showing the means for introducing pressurized air to the pair of forward-facing projections.
Figure 5:
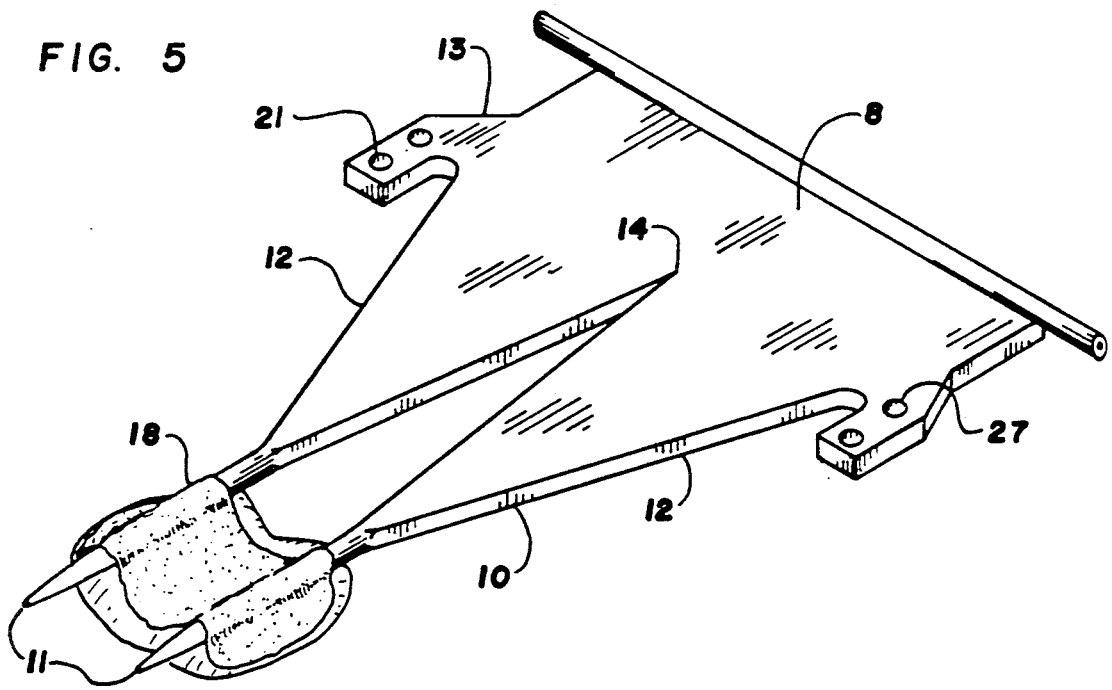
FIG. 5 is a perspective view of the wing showing a poultry breast piece in position on the apparatus.

With reference to FIG. 4, the pointed ends 11 contain openings 15 which communicate with passages 16 which pass through the wing 8 and communicate with an opening 17 through which pressurized air may be introduced from an external source.

The operation of the device may be illustrated with reference to FIG. 3. A poultry breast fillet is placed on the lower conveyor 2 at the feed end 3. The skin side is placed uppermost. The skin of a poultry breast is most firmly attached to the meat portion along the portion of the breast lying most closely to the breastbone, and along the rib cage area. Along either side the skin is more loosely attached and, in fact, forms pockets along either side of the center portion where the skin is separated from the meat portion or only loosely attached. The operator guides the poultry breast fillet 18 onto the pointed ends 11 of the wing 8. There, pressurized air expelled through the openings 15 begins the process of separating the skin from the meat portion. The lower conveyor 3 moves the poultry breast along the rounded projections 10 until the upper conveyor 5 begins to grip the skin portion of the breast. The poultry breast fillet is thus positively transported through the machine under the pressure of both the lower conveyor 3 and the upper conveyor 5. Adjustment of the lower conveyor 3 and the wing 8 serves to maintain the appropriate amount of contact between the lower conveyor 3 and the poultry breast fillet. As the poultry breast fillet enters the flared sections 12, the skin is gradually separated from the meat portion through the action of the two flaring sections 12 which gradually detach all of the loosely attached skin from the meat portion.

As the poultry breast fillet advances further into the mechanism, the remaining firmly attached section of skin along the breastbone area is sheared off through the action of the sharp edged slot 14 defined by the merger of the two flared portions 12 into the main body 13 of the wing 8.

Once the skin has been completely separated from the meat portion, the action of the upper conveyor 5 and the lower conveyor 3 transport the separated skin and meat portions to the discharge end 4 where the skin portion and the meat portion may be separately discharged.

Various modifications to the preferred embodiment as described herein would be obvious to those of ordinary skill in the art and it is not intended that the preferred embodiment as described above in any way limit the scope of the present invention as may be determined by a reference to the following claims.

What is claimed is:

1. A device for removing the skin from poultry breasts fillets, comprising:

a table;

a lower conveyor supported on said table, having a feed end and a discharge end;

an upper conveyor pivotally connected to said table proximal to said discharge end of said lower conveyor;

means for separating the skin from poultry breasts fillets disposed between said upper conveyor and said lower conveyor, said means for separating comprising: a wing having a pair of rounded projections having pointed ends facing said feed end of said table;

said rounded projections further having flared sections widening toward said discharge end and merging into the main body of said wing proximal to said discharge end;

said flared section further defining a sharp-edged slot where said flared sections merge into said main body; and means for adjusting the vertical distance between said lower conveyor and said means for separating the skin from poultry breast fillets.

2. A device as set forth in claim 1 further comprising: openings in said pointed ends of said rounded projections, and means for expelling air under greater than ambient pressure through said openings.

3. A device as set forth in claims 1 or 2 further comprising means for adjusting the angle between said upper conveyor and said means for separating the skin from poultry breast fillets, such that the degree of pressure of the upper conveyor on the means for separating may be varied.

4. A device as set forth in claim 3 wherein said means for separating skin from poultry breast fillets is freely pivotally connected to said table proximal to said discharge end of said lower conveyor, such that varying thicknesses of poultry breast fillets may be accommodated between said lower conveyor and said means for separating.

5. A device as set forth in claim 4 further comprising means to adjust the angle between said lower conveyor and said means for separating, such that varying thicknesses of poultry breast fillets may be accommodated between said lower conveyor and said means for separating.

6. A device as set forth in claim 5 wherein said lower conveyor comprises a rubber belt having V-shaped wedges for traction.

7. A device as set forth in claim 5 wherein said upper conveyor comprises a belt of linked slats.

8. A device as set forth in claim 2 wherein said means for expelling air comprises passages communicating with said openings in said pointed ends of said rounded projections and extending through to the discharge end of said wing to means for connecting said passages to an external source of pressurized air.

* * * * *